Patented July 26, 1949

2,477,338

UNITED STATES PATENT OFFICE 2,477,338

PROMOTION OF CONJUGATED DIENE EMULSION POLYMERIZATION BY TRICHLOROMETHYL-SUBSTITUTED MERCAPTANS

James Emory Kirby and William Henry Sharkey, Wilmington, Del., assignors to E. I. du Pont de Nemours & Company, Wilmington, Del., a corporation of Delaware No Drawing. Application May 30, 1945, Serial No. 596,805

6 Claims. (Cl. 260—92.3)

This invention relates to polymeric materials and more particularly to a process of preparing improved synthetic plastic polymers and rubber-like polymers.

This invention has as an object the provision of a new class of modifying agents for synthetic rubbers, and more specifically, improved rubber-like diene polymers. A particular object is to provide improved copolymer rubbers of diene hydrocarbons with other polymerizable materials. A still further object is to provide polymers and copolymers of monoethylenically unsaturated compounds having improved solubility in organic solvents, reduced viscosity in solution and improved flow properties.

The objects are accomplished by the following invention wherein a polymerizable unsaturated compound having at least one $CH_2=C<$ group is polymerized by exposing the same to polymerizing conditions in the presence of an aliphatic monothiol containing a trichloromethyl, $Cl_3C-$, group and having from two to twenty-five carbon atoms.

In the preferred practice of this invention an aqueous emulsion is formed of the unsaturated polymerizable compound or compounds together with 0.1–10.0%, preferably 0.1–3%, of a mercaptan containing a trichloromethyl group, such as 5,5,5-trichloropentanethiol, and an emulsifying agent such as an alkali metal salt of a long chain fatty acid and the emulsion is polymerized in the ways known to the art. The polymerization is preferably initiated by a peroxy compound such as potassium persulfate, at a temperature of 5–100° C., preferably 20–60° C. The modified polymer so formed is isolated by precipitation from the aqueous emulsion by the usual means, e. g., by adding acid, electrolyte, or alcohol. This polymer after it is washed and dried can be satisfactorily processed in conventional equipment.

Synthetic rubber-like polymers and copolymers formed when a 1,3-diene, e. g., 1,3-butadiene or 2-chloro-1,3-butadiene, is one of the polymerizable compounds, can be compounded with carbon black, metallic oxides, sulfur, and vulcanization accelerators and cured to give vulcanizates of high tear resistance and good tensile strength.

The more detailed practice of the invention is illustrated in the following examples, wherein parts given are by weight. There are, of course, many forms of the invention other than these specific embodiments.

Example I

A mixture of 1.5 parts of 5,5,5-trichloropentanethiol, 75 parts of 1,3-butadiene and 25 parts of styrene is emulsified in a mixture of 150 parts of water containing 4 parts of oleic acid, 1.13 parts of sodium hydroxide, 1.0 part of a condensation product of formaldehyde and naphthalenesulfonic acid sodium salt, 0.1 part of potassium ferricyanide and 1.0 part of potassium persulfate. The emulsion is vigorously agitated for 20 hours at 40° C. To the resulting synthetic rubber latex is added 6.24 parts of a 50% dispersion in water of a mixture of phenyl-alpha-naphthylamine (55 parts) and diphenylamine (45 parts) as an antioxidant. Dilute acetic acid is added together with saturated sodium chloride solution to coagulate the polymer. This product is then washed with water at 50° C. for 10 minutes on a rubber mill having a corrugated roll, and is then dried on a smooth roll rubber mill at 40–50° C. At this stage the product amounting to 97 parts, is a plastic material, which, although somewhat tougher and less tacky than a corresponding rubber modified with a simple long chain mercaptan, is readily processed. It may be plasticized further with 0.5–1.5% of the zinc salt of xylyl mercaptan.

The above synthetic rubber is compounded with 2 parts of sulfur, 50 parts of medium processing channel black, 2 parts of stearic acid, 5 parts of zinc oxide and 1.25 parts of 2-mercaptothiazoline. After curing for 30 minutes at 141° C. the vulcanizate exhibits a tear strength of 460 lbs./in. as determined by the American Society for Testing Materials method (D–624–41T), and tensile strength of 3120 lbs./sq. in. at 590% elongation. When compounded and cured in a similar way commercial 75:25 butadiene/styrene copolymers (GR–S) prepared with dodecyl mercaptan as a modifier show tear strength of 200–300 lbs./in. and a tensile strength of 2500–3000 lbs./sq. in. at 500–600% elongation. A 75:25 butadiene/styrene rubber prepared in 93.5% yield with 0.75% of dodecyl mercaptan exhibited a tear strength of only 230 lbs./in. and a tensile strength of 2470 lbs./sq. in. at 375% elongation.

Example II

Mixtures of butadiene with other vinyl monomers are polymerized as described in Example 1 in the presence of small amounts of mercaptans containing the trichloromethyl group. The properties of channel black vulcanizates of the resulting rubbers compounded and cured as in Example 1 are given in the following table.

As is readily apparent from an inspection of the data in the following table, high quality rubbers of excellent tear strength result when mercaptans having a trichloromethyl group are used as polymerization modifiers even when yields as high as 97–100% are taken.

lbs./sq. in. at 2% elongation for the unmodified polymer.

| Monomer Mixture | Mercaptan | Parts/100 Parts of Monomer | Cycles, hr./C | Polymer Product Yield, Per Cent | M/300 [1] | $T_B/E_B$ [2] | Tear Strength, lbs./in. [3] |
|---|---|---|---|---|---|---|---|
| 75 parts butadiene, 25 parts styrene | Dodecyl mercaptan | 0.75 | 20/40 | 93.5 | 1,790 | 2,470/375 | 230 |
| Do | 5,5,5-Trichloropentanethiol | 1.5 | 30/40 | 97 | 1,520 | 3,120/490 | 460 |
| Do | do | 1.5 | 20/40 | 83 | 1,450 | 3,040/500 | 445 |
| Do | do | 2.0 | 44/40 | 93.5 | 1,150 | 2,880/540 | 370 |
| Do | do | 3.0 | 44/40 | 89 | 1,550 | 3,340/480 | 485 |
| Do | 3,3,3-Trichloropropanethiol | 0.75 | 20/40 | 54 | 1,550 | 4,100/520 | 380 |
| Do | 9,9,9-Trichlorononanethiol | 1.5 | 30/40 | 100 | 1,375 | 2,740/500 | 340 |
| 70 Butadiene, 30 Dimethyl(vinylethinyl)carbinol | 5,5,5-Trichloropentanethiol | 1.5 | 20/40 | 93.5 | 1,600 | 4,100/550 | 500 |
| Do | Octyl mercaptan | 0.5 | 80/30 | 96 | 1,830 | 3,465/435 | 205 |
| 75 Butadiene, 20 Styrene, 5 Dimethyl(vinylethinyl) carbinol | 5,5,5-Trichloropentanethiol | 1.5 | 30/40 | 100 | 1,050 | 2,860/500 | 455 |
| Do | Dodecyl mercaptan | 0.75 | 17/40 | 94 | 1,590 | 2,240/465 | 250 |

[1] M/300=stress in lbs./sq. in. at 300% elongation.
[2] $T_B/E_B$=tensile strength lbs./sq. in. at break elongation (per cent).
[3] Tear strength by the American Society for Testing Materials method D624–41T.

*Example III*

A mixture of 100 parts of 2-chloro-1,3-butadiene, 0.6 part of 5,5,5-trichloropentanethiol, 4 parts of wood rosin and 0.25 part of stearic acid is emulsified in a solution of 0.75 part of a condensation product of formaldehyde and the sodium salt of naphthalenesulfonic acid, 0.8 part of sodium hydroxide, 0.5 part of potassium persulfate and 157 parts of water. The emulsion is then heated to 40° C. for 3 hours and to the resulting synthetic rubber latex is added 8 parts of a 25% dispersion of tetraethylthiuram disulfide in water and 4 parts of a 50% dispersion of a mixture of phenyl-alpha-naphthylamine (55 parts) and diphenylamine (45 parts). Dilute acetic acid is added together with saturated sodium chloride solution to coagulate the synthetic rubber. This product is then washed with water at 50° C. for 10 minutes on a rubber mill having a corrugated roll and is then dried on a smooth roll rubber mill at 40–50° C. The yield amounts to 60 parts.

The above synthetic rubber is compounded with 2.5 parts of phenyl-alpha-naphthylamine, 36 parts of medium processing channel black, 4 parts of extra light calcined magnesium oxide, and 5 parts of zinc oxide. After curing for 30 minutes at 153° C. the vulcanizate shows a tear strength of 410 lbs./in. as determined by the American Society for Testing Materials method (D–624–41T), and a tensile strength of 2460 lbs./sq. in. at 900% elongation.

*Example IV*

A mixture of fifty parts of methyl methacrylate and 0.05 part of 5,5,5-trichloropentanethiol is emulsified in a solution of 2 parts of the sodium salt of a long chain alkanesulfonic acid containing approximately 16 carbon atoms, 0.25 part of ammonium persulfate, 0.05 part of sodium bisulfite, 0.25 part of potassium hydrogen phosphate, 0.25 part of potassium dihydrogen phosphate and 93.75 parts of water. The resulting emulsion is blanketed with nitrogen and heated at 40° C. for 24 hours. The latex so obtained is steamed to remove unpolymerized methyl methacrylate and coagulated by addition of sodium chloride. The coagulated polymer, washed and dried, weighs 48.5 parts (97% of theoretical). A 0.1% solution of this polymer in chloroform has a relative viscosity of 1.092 compared to a value of 1.326 for a similar polymer prepared in the same manner except that the 5,5,5-trichloropentanethiol is omitted. Also a pressed film of this polymer has a tensile strength of 4350 lbs./sq. in. at 2% elongation as compared to 3620

The above examples are merely illustrative and the invention broadly comprises the polymerization of the herein mentioned monomeric compounds either singly or in admixture of two or more, in the presence of a mercaptan containing a trichloromethyl group.

Any aliphatic or cycloaliphatic monothiol mercaptan having a trichloromethyl group and containing from 2–25 carbon atoms may be used in the practice of this invention. The lower members of this series, for example mercaptans containing from 3–15 carbon atoms, are especially preferred since thiols of higher hydrocarbon content are not as active and require larger amounts, e. g. up to 10%, for substantial modification. The amount of mercaptan used to obtain optimum results is dependent upon the particular mercaptan employed. For example, 5,5,5-trichloropentanethiol gives best results in regard to processing and vulcanizate properties when used in an amount corresponding to 1–5 parts per hundred parts of polymerizable monomer used in the preparation of the polymer. On the other hand, when 3,3,3-trichloropropanethiol is employed only 0.25–0.75 part per hundred parts of monomer is preferred to obtain products having both good mill behavior and good vulcanizate properties and in some cases even less can be used advantageously. High yields of satisfactory polymers may be obtained when the mercaptans are used in amounts up to 10%. When relatively large amounts, e. g., 5–10% are used, the polymers will tend to be excessively tacky in certain cases and it is generally preferable to employ 0.2–5% based on polymerizable monomer.

The type of mercaptan that may be employed in the practice of this invention is $Cl_3C-R-SH$ where R is a divalent aliphatic or cycloaliphatic radical i. e., a radical aliphatic in character, preferably a saturated hydrocarbon radical, having at least one carbon atom and preferably not more than twenty-four carbon atoms. Especially preferred are mercaptans of formula $$Cl_3C(CH_2CH_2)_nSH$$

where $n$ is from one to seven. These latter compounds are readily obtained by treatment with sodium hydrogen sulfide of chloro compounds resulting from the reaction of olefines, such as ethylene, and carbon tetrachloride as described in copending application Serial No. 438,466 filed April 10, 1942, now U. S. Patent 2,440,800. These chloro compounds may be prepared by placing one part each of water and carbon tetrachloride together with about 0.002 part of benzoyl peroxide in a stainless steel autoclave, pressuring with ethylene and heating to about 95° C. The temperature may rise to as high as 150° C. Ethylene is added under pressure (usually maintained above 100 lbs./sq. in.) to replace that used in the reaction until absorption ceases. After cooling, the organic layer of the reaction mixture is separated, washed, and carbon tetrachloride removed by distillation. Fractionation of the products remaining leads to about 10% 1,3,3,3-tetrachloropropane, 50% of 1,5,5,5-tetrachloropentane, 22% of 1,7,7,7-tetrachloroheptane and 4% of 1,9,9,9-tetrachlorononane. Variation of the reaction conditions will give different proportions of the reaction products.

The alpha,omega,omega,omega - tetrachloro products obtained by the reaction of conjugated diene hydrocarbons, e. g., butadiene, with carbon tetrachloride as more fully set forth in copending application Serial No. 438,458 filed April 10, 1942, now U. S. Patent No. 2,401,099 of W. R. Peterson may also be reacted with sodium hydrosulfide to give omega-trichloromethyl substituted unsaturated mercaptans of use in this invention. Exemplary omega - trichloromethyl substituted mercaptans which may be used include 2,2,2-trichloroethanethiol, 3-trichloromethylcyclohexanethiol, etc.

While the trichloromethyl substituted mercaptans are of value in the polymerization and especially in the emulsion polymerization of any polymerizable organic compound having at least one $CH_2=C<$ group, they are of particular value with two classes of such materials, namely, with conjugated or 1,3-dienes, and with monoethylenically unsaturated compounds having the ethylenic linkage as their only acyclic carbon to carbon unsaturation. The modified polymerization of this invention is of greatest value in the polymerization of dienes to obtain synthetic rubbers.

The types of synthetic rubber which can be modified with mercaptans containing a trichloromethyl group are in general those which are prepared by the polymerization of a 1,3-diene such as 1,3-butadiene, 2-chloro-1,3-butadiene, isoprene, 2-fluoro-1,3-butadiene, 2-bromo-1,3-butadiene, 2,3-dimethyl-1,3-butadiene, piperylene, etc., or a mixture of such a diene preferably at least 60% with up to 40% of one or more vinyl or vinylidene compounds such as styrene, acrylonitrile, methyl methacrylate, dimethyl(vinylethinyl) carbinol, vinylidene chloride, methyl vinyl ketone, vinylpyridine, vinylfurans and the like. The modified diene polymers prepared by the process of this invention are of substantially improved tear strength. Thus a 75/25 butadiene-styrene copolymer prepared by the process of this invention has a tear strength above 300 lbs./in. whereas commercial GR-S has a tear strength of about 250 lbs./in.

Polymers and copolymers of monoethylenically unsaturated compounds which can be modified with mercaptans containing a trichloromethyl group include those obtained by polymerization and copolymerization of methyl, ethyl, butyl and higher homologous esters of acrylic, methacrylic, alpha-halogen acrylic, maleic and fumaric acids; acrylonitrile, methacrylonitrile, methacrylamide, N-alkyl methacrylamide, N-vinyl phthalimide, N-alkyl maleimides, styrene, methyl vinyl ketone, vinyl chloride, vinyl acetate, vinylidene chloride, vinylpyridine, ethylene and the like. With polymers of this type it is generally preferred to use a smaller amount of the mercaptan than with polymers prepared using a 1,3-diene as one component. For example, it is preferred to use only 0.1 to 0.5% when 5,5,5-trichloropentanethiol is the modifier and even less if 3,3,3-trichloropropanethiol is used although amounts as high as 5% may be used for specific purposes. The lower omega-trichloromethylalkane thiols are more effective, on the weight mass, than are the higher.

The dispersion in which mixtures of dienes or dienes and a minor proportion of a vinyl or vinylidene compound and a mercaptan containing a trichloromethyl group are polymerized may be alkaline, neutral or acidic depending upon the nature of the dispersing agent employed. Polymerization may be carried out at a temperature range of 5–100° C. although a range of 20–60° C. is preferred. Superatmospheric pressures may be employed during polymerization, particularly if the temperature of polymerization exceeds the boiling point of any of the monomers present. The catalyst employed to induce polymerization may be any of those commonly employed, for example, potassium and ammonium persulfates, hydrogen peroxide, benzoyl peroxide, sodium perborate, etc.

In general the uses for the various modified polymers of this invention are similar to those for which the corresponding unmodified polymers may be employed. However, the preferred synthetic rubber-like polymers prepared by the process of this invention have better tear strength combined with good tensile strength. Moreover, they show better tear strength than corresponding polymers prepared in the presence of simple unsubstituted aliphatic thiols or better known modifiers. In comparison with unmodified polymers they also exhibit very superior plasticity and milling characteristics. Highly tear resistant vulcanizates are of particular importance in the manufacture of tires, tubes, and other rubber articles. The polymers of monoethylenically unsaturated monomers having but one acyclic carbon to carbon unsaturated which are prepared by the polymerization process of this invention have improved flow properties and are readily pressed into wrapping films or molded into transparent plates, bars and the like.

While the examples have illustrated the invention using the emulsion polymerization technique, the improvement is also obtained in bulk, bead or granular, and solution polymerization. The polymerization may be batch or continuous.

The term "polymer" is employed herein to denote a high polymer, i. e. a macromolecular polymer, i. e. a polymer having a degree of polymerization of at least 100.

Many widely different embodiments of the invention may be made without departing from the spirit and scope thereof. The invention is therefore not limited to the herein disclosed specific embodiments thereof except as defined in the appended claims.

What is claimed is:

1. In the aqueous emulsion polymerization of polymerizable organic compounds of the class consisting of butadiene-1,3 hydrocarbons and their 2-monohalogen derivatives the improvement wherein the polymerizable compound is subjected to polymerizing conditions in the presence of 0.2 to 10% of an aliphatic monothiol of two to nine carbon atoms and containing a trichloromethyl group.

2. In the aqueous emulsion polymerization of acyclic polymerizable conjugated butadiene-1,3 hydrocarbons the improvement wherein the polymerizable compound is subjected to polymerizing conditions in the presence of 0.2 to 10% of an aliphatic monothiol of two to nine carbon atoms and containing a trichloromethyl group.

3. In the preparation of synthetic rubber from a polymerizable composition predominantly comprising a butadiene-1,3 hydrocarbon the improvement wherein the polymerization is effected in aqueous emulsion and in the presence of 0.2 to 10% of a thiol of the class consisting of aliphatic and cycloaliphatic monothiols of two to nine carbon atoms and containing a trichloromethyl group.

4. In the preparation of synthetic rubber from an aqueous emulsion of a polymerizable composition predominantly comprising an acyclic butadiene-1,3 hydrocarbon, the improvement wherein the polymerization is effected in the presence of 0.2 to 10%, based on the weight of monomer, of a thiol of the formula $$Cl_3C-R-SH$$

wherein R is a saturated acyclic divalent aliphatic radical of from three to eight carbon atoms.

5. In the preparation of synthetic rubber from an aqueous emulsion of a polymerizable composition predominantly comprising an acyclic butadiene-1,3 hydrocarbon, the improvement wherein the polymerization is effected in the presence of 0.2 to 10%, based on the weight of monomer, of 5,5,5-trichloropentanethiol.

6. In the preparation of synthetic rubber from an aqueous emulsion of a polymerizable composition predominantly comprising an acyclic butadiene-1,3 hydrocarbon, the improvement wherein the polymerization is conducted in the presence of 0.2 to 10% of a monothiol aliphatic in character and containing a trichloromethyl group in omega position and separated from the thiol group in the alpha position by a saturated acyclic divalent radical of from two to nine carbon atoms.

JAMES EMORY KIRBY.
WILLIAM HENRY SHARKEY.

No references cited.

Certificate of Correction

Patent No. 2,477,338                                                   July 26, 1949

JAMES EMORY KIRBY ET AL.

It is hereby certified that errors appear in the printed specification of the above numbered patent requiring correction as follows:

Columns 3 and 4, in the table, seventh column thereof, last line, for "2,240/465" read *3,240/465*; column 6, line 32, for "beter" read *better*;

and that the said Letters Patent should be read with these corrections therein that the same may conform to the record of the case in the Patent Office.

Signed and sealed this 17th day of January, A. D. 1950.

[SEAL]

THOMAS F. MURPHY,
*Assistant Commissioner of Patents.*